(12) United States Patent
Rhee et al.

(10) Patent No.: US 8,111,990 B2
(45) Date of Patent: Feb. 7, 2012

(54) APPARATUS FOR TRANSFERRING OPTICAL DATA IN OPTICAL SWITCHING SYSTEM USING TIME SYNCHRONIZATION

(75) Inventors: June Koo Rhee, Daejeon (KR); Ji Hwan Kim, Daejeon (KR); Jung Yul Choi, Daejeon (KR); Min Ho Kang, Seoul (KR)

(73) Assignee: ICU Research and Industrial Cooperation Group, Daejeon (KR)

( * ) Notice: Subject to any disclaimer, the term of this patent is extended or adjusted under 35 U.S.C. 154(b) by 207 days.

(21) Appl. No.: 12/518,765

(22) PCT Filed: Feb. 8, 2007

(86) PCT No.: PCT/KR2007/000693
§ 371 (c)(1),
(2), (4) Date: Feb. 24, 2010

(87) PCT Pub. No.: WO2008/072819
PCT Pub. Date: Jun. 19, 2008

(65) Prior Publication Data
US 2010/0142942 A1 Jun. 10, 2010

(30) Foreign Application Priority Data
Dec. 12, 2006 (KR) ........................ 10-2006-0126258

(51) Int. Cl.
*H04J 14/00* (2006.01)
(52) U.S. Cl. ................ 398/45; 398/50; 398/52; 398/53; 398/56

(58) Field of Classification Search .................... 398/45, 398/47, 50, 51, 52, 53, 54, 55, 56, 154, 102, 398/161
See application file for complete search history.

(56) References Cited

U.S. PATENT DOCUMENTS

| | | | | |
|---|---|---|---|---|
| 7,024,115 | B2 * | 4/2006 | Ishimaru | 398/57 |
| 7,068,936 | B2 * | 6/2006 | Pau et al. | 398/52 |
| 7,292,784 | B2 * | 11/2007 | Lee et al. | 398/49 |
| 7,522,836 | B2 * | 4/2009 | Islam | 398/48 |
| 2006/0146888 | A1 | 7/2006 | Hollander et al. | |

FOREIGN PATENT DOCUMENTS

| | | |
|---|---|---|
| JP | 07-336324 A | 12/1995 |
| JP | 09-214503 A | 8/1997 |
| KR | 1020060039796 A | 5/2006 |
| KR | 1020060079090 A | 7/2006 |

* cited by examiner

*Primary Examiner* — M. R. Sedighian
(74) *Attorney, Agent, or Firm* — The Webb Law Firm (57) ABSTRACT

Provided is an apparatus for transferring optical data in an optical switching system using time synchronization. The apparatus performs time synchronization on optical data to input the optical data at regular intervals through fiber delay line for time synchronization respectively disposed on input ports. Therefore, the apparatus can efficiently reduce a data blocking rate in comparison with a conventional optical switching system using an asynchronous electric buffer without a synchronous process, and achieve the same performance as conventional asynchronous technology despite using fewer wavelength converters and buffers, thus reducing system cost. In addition, using dynamic time synchronization modules, the apparatus performs time synchronization for minute time variation due to an environment such as temperature.

15 Claims, 6 Drawing Sheets

APPARATUS FOR TRANSFERRING OPTICAL DATA IN OPTICAL SWITCHING SYSTEM USING TIME SYNCHRONIZATION

TECHNICAL FIELD

The present invention relates to an apparatus for transferring optical data in an optical switching system. More particularly, the present invention relates to an apparatus for transferring optical data in an optical switching system using time synchronization, capable of efficiently performing optical data transfer using a few shared buffers by decreasing the probability of contention between optical data when the input optical data are time-synchronized for passive switching.

BACKGROUND ART

Optical burst switching (OBS) and optical packet switching (OPS) are a very advanced research area in the optical network field. However, only an extremely small part of the technology has been developed into solutions for a high-speed (peta-bits/second) broadband system suitable for real application requirements regarding performance, cost, power consumption, and so on.

The optical packet or optical burst switching is mainly classified into two hardware functions referred to as switch fabric and buffering, both of which utilize passive or active technology.

Here, most active technology enables complex optical signal processing using a semiconductor optical amplifier (SOA) and a wavelength converter, but this requires complex control, consumes much power, and needs rather complex device technology.

On the other hand, passive technology can overcome the drawbacks of the active technology but has a drawback with which wavelength conversion for wavelength continuity required in optical packet or optical burst switching systems is not provided for a wavelength division multiplexing (WDM) system schemes.

On the basis of such merits and demerits of the hardware functions, a new optical switching system in which a passive switching unit is combined with an active buffering unit has been suggested according to the conventional art.

The conventional optical switching system uses an asynchronous method of inputting optical data regardless of input time and data size rather than at a pre-determined time or in a uniform size. Thus, data collision frequently occurs, and many shared active buffers and optical wavelength converters are needed.

DISCLOSURE OF INVENTION

Technical Problem

In consideration of the above problems of the conventional optical switching system, it is an object of the present invention to provide an efficient and low-priced apparatus for transferring optical data capable of obtaining the same performance as an asynchronous system despite using fewer shared buffers and wavelength converters. This is because a lower data contention rate is obtained by time synchronization of input optical data in an optical burst or optical packet switching system. The optical burst or optical packet switching system transfers optical data not contending with each other through output resources, i.e., a wavelength channel such as output optical fiber, corresponding to a desired destination node using a passive switching unit alone, transfers optical data contending with each other for the output resources to an active buffer module having a wavelength conversion function, converts optical signals corresponding to the optical data into electric signals and temporarily stores them, and then, when new available output resources are detected, converts the stored optical data into the output resources, and transfers them to an output port corresponding to a desired destination node.

Technical Solution

In order to achieve the above object, according to one aspect of the present invention, an apparatus for transferring optical data in an optical switching system using time synchronization, the optical switching system comprising demultiplexers and multiplexers respectively connected to a plurality of input ports and output ports and transferring optical data having transfer information using a plurality of wavelengths, and a switch connected between the demultiplexers and the multiplexers and switching the optical data to an output port of a desired destination node, comprises: time synchronization means respectively disposed on the input ports to dynamically time-synchronize all the optical data before optical data are input to the demultiplexers; time measurement means connected between the switch and the multiplexers to measure output times of all optical data output from the switch; buffer means connected between input terminals and output terminals of the switch, and receiving the optical data from the switch when contention occurs among the optical data to perform buffering according to whether or not output resources are available and then transfer them to a corresponding output port; and control means for checking contention between the optical data on the basis of the transfer information according to whether or not output resources are available to control the switch, receiving information on output times of all the optical data measured by the time measurement means and comparing the information with a previously set reference switching time to determine whether or not to perform time synchronization, and controlling output times of the optical data output from the buffer means according to the determination result.

The time synchronization means may comprise: fiber delay lines respectively connected to the input ports, delaying the input optical data for a predetermined time, and outputting the optical data to transfer the optical data at regular intervals; and dynamic time synchronization modules respectively connected to output terminals of the fiber delay lines, and dynamically performing time synchronization on minute time variations depending on an external environment in response to a control signal of the control means, wherein the control means measures output times of the optical data passed through the fiber delay lines, compares the output times with the previously set reference switching time to determine whether to perform time synchronization or not, and controls the dynamic time synchronization modules according to the determination result.

The dynamic time synchronization module may comprise: at least one optical circulator disposed on an optical path among first to third optical fibers, and transferring the optical data output from the fiber delay lines to the second optical fiber through the first optical fiber and optical data output in a reverse direction from the second optical fiber to the outside through the third optical fiber; and at least one optical delay unit: including an optical fiber-space collimator receiving the optical data transferred through the second optical fiber and generating a light beam in a free space, and an optical reflector for reflecting the light generated by the optical fiber-space collimator and making the reflected light travel through the optical fiber-space collimator again; and delaying the optical data output from the fiber delay lines for a predetermined time and then outputting the optical data according to a position of the optical reflector on a moving stage, wherein the third optical fiber is directly connected to the demultiplexer when there is one optical circulator and optical delay unit, the optical circulators are connected by the first and third optical fibers when there are two or more optical circulators and optical delayers, the third optical fiber connected to the last optical circulator is connected to the demultiplexer, and the control means controls the positions of the optical reflectors to adjust a delay time of the optical data.

The dynamic time synchronization module may comprise: at least one optical isolator disposed on an optical path between first and second optical fibers, transferring the optical data output from the fiber delay lines to the second optical fiber through the first optical fiber, and blocking optical data output in a reverse direction from the second optical fiber; at least one optical splitter disposed on an optical path among the second optical fiber and third and fourth optical fibers, transferring optical data output through the second optical fiber to the third optical fiber, and transferring optical data output in a reverse direction from the third optical fiber to the outside through the fourth optical fiber; and at least one optical delay unit: including an optical fiber-space collimator receiving the optical data output through the third optical fiber to generate light in a free space, and an optical reflector for reflecting the light generated by the optical fiber-space collimator and making the reflected light travel through the optical fiber-space collimator again; and delaying the optical data output from the fiber delay lines for a predetermined time and then outputting the optical data according to a position of the optical reflector, wherein the fourth optical fiber is directly connected to the demultiplexer when there is one optical isolator, optical splitter and optical delay unit, the first and fourth optical fibers are connected to each other when there are two or more optical isolators, optical splitters and optical delay units, the fourth optical fiber connected to the last optical splitter is connected to to demultiplexer, and the control means controls positions of the optical reflectors to adjust a delay time of the optical data.

The buffer means may comprise: an optical/electric conversion unit for converting optical signals corresponding to the input optical data into electric signals; a buffering unit for temporarily storing the optical data converted into the electric signals; and an electric/optical conversion unit for, when output resources are available, converting the electric signals corresponding to the optical data stored in the buffering unit into optical signals corresponding to the available output resources.

The buffer means may further comprise an electric switch connected between the buffering unit and the electric/optical conversion unit and switching the optical data stored in the buffering unit to the available output resources of the electric/optical conversion unit in response to a control signal of a control module.

The optical/electrical conversion unit may comprise a plurality of optical receivers.

The buffering unit may comprise an electrical random access memory (RAM).

The optical/electrical conversion unit may comprise a plurality of optical transmission laser diodes.

The laser diodes may be variable wavelength or fixed wavelength laser diodes.

The buffer means may comprise a buffering unit for temporarily storing the input optical data; and a wavelength conversion unit for, when output resources are available, converting the optical data stored in the buffering unit into a wavelength corresponding to the available output resources.

The buffer means may further comprise a buffer switch connected between the buffering unit and the wavelength conversion unit, and switching the optical data stored in the buffering unit to the available output resources of the wavelength conversion unit in response to a control signal of a control module.

The buffering unit may comprise an optical memory.

The apparatus for transferring optical data may further comprise fiber delay lines for time difference compensation respectively disposed on optical wavelength channels separated by the demultiplexers, and delaying the optical data for a predetermined time and then outputting the optical data to compensate for a time difference between wavelengths due to transmission-fiber chromatic dispersion.

The apparatus for transferring optical data may further comprise fiber delay lines respectively disposed on optical wavelength channels between the switch and the multiplexers, and delaying the optical data for a predetermined time and then outputting the optical data to compensate for a difference in optical data transfer time due to an external environment of optical lines.

ADVANTAGEOUS EFFECTS

According to the apparatus and method for transferring optical data in an optical switching system using time synchronization, the time synchronization is performed on all optical data before the optical data are input to a switch, and the optical data are input with a uniform size at regular intervals. Thus, a data blocking rate can be reduced to be lower than that of a conventional optical switching system using an asynchronous electric buffer without a synchronization process, and system cost is reduced by obtaining the same performance despite using fewer wavelength converters and buffers in comparison with conventional asynchronous technology.

Meanwhile, as the use of a synchronous switching system, the sharing ratio and the ratio of the required number of buffers, can be reduced to achieve the same performance with the asynchronous system. This is the main reason for reduction of the overall cost and power consumption because OEOs and WCs are the most expensive and power-consuming parts of the system.

MODE FOR THE INVENTION

An apparatus for transferring optical data according to an exemplary embodiment of the present invention can be used in all the optical switching systems, e.g., an optical packet switching system and an optical burst switching system.

First of all, terminology generally used in this specification including the title of the present invention, detailed description, claims, etc. will be defined in brief.

The terminology "optical data" indicates all data transferred from each node in an optical switching system. Particularly, in an optical packet switching system, it means an optical packet including a header packet and a data packet and, in an optical burst switching system, an optical burst having a control packet and a data burst.

The terminology "transfer information" indicates every kind of information for transferring the above-described optical data to a desired destination node. Particularly, in an optical packet switching system, the terminology includes header information or routing information of an optical packet and, in an optical burst switching system, information on a control packet, e.g., burst size, offset time, routing information, class number, etc.

Now, exemplary embodiments of the present invention will be described in detail with reference to the accompanying drawings.

Figure 1:
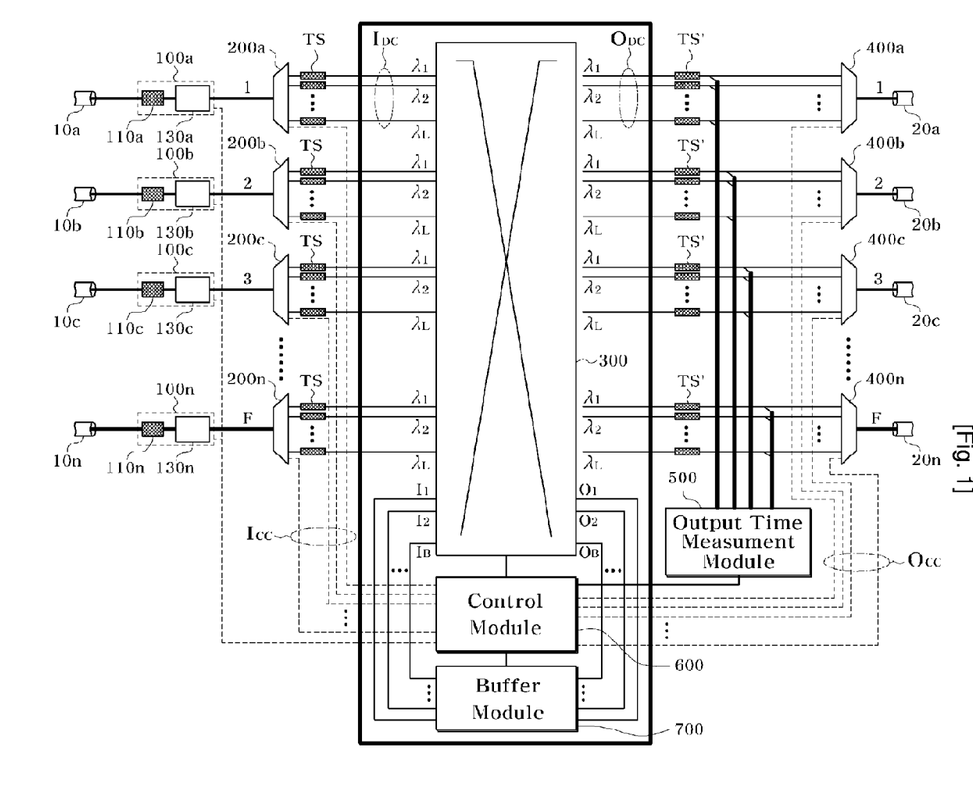
FIG. 1 illustrates an overall constitution of an apparatus for transferring optical data in an optical switching system using time synchronization according to an exemplary embodiment of the present invention.
Figure 2:
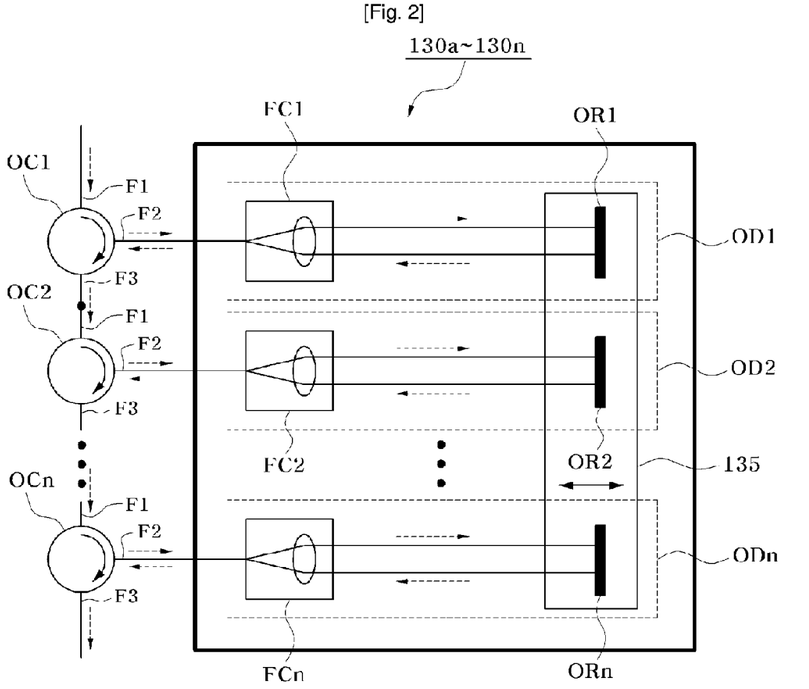
FIG. 2 illustrates an example of a constitution of a dynamic time-synchronization module employed in an exemplary embodiment of the present invention.
Figure 3:
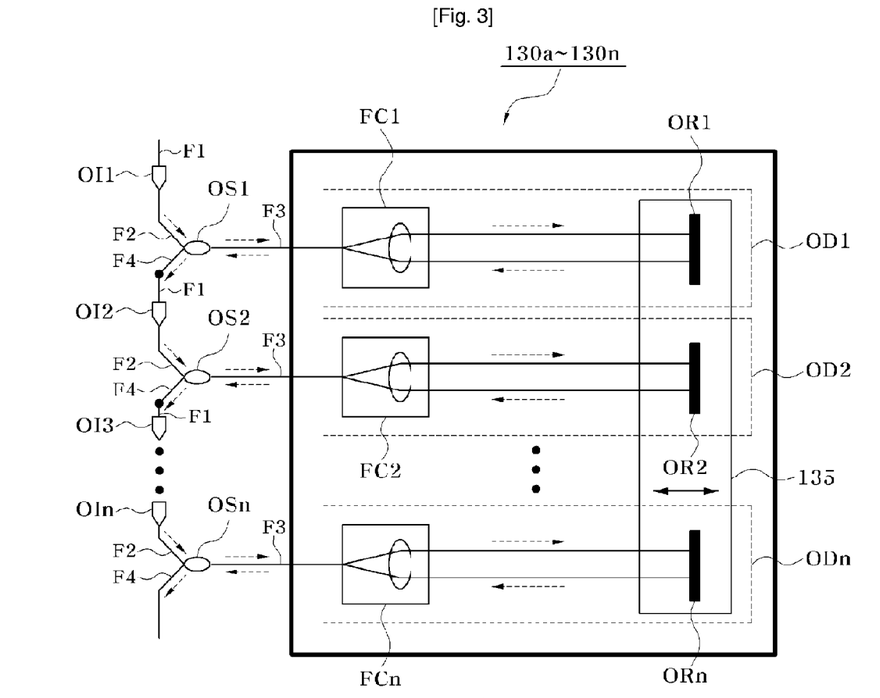
FIG. 3 illustrates another example of a constitution of a dynamic time-synchronization module employed in an exemplary embodiment of the present invention.
Figure 4:
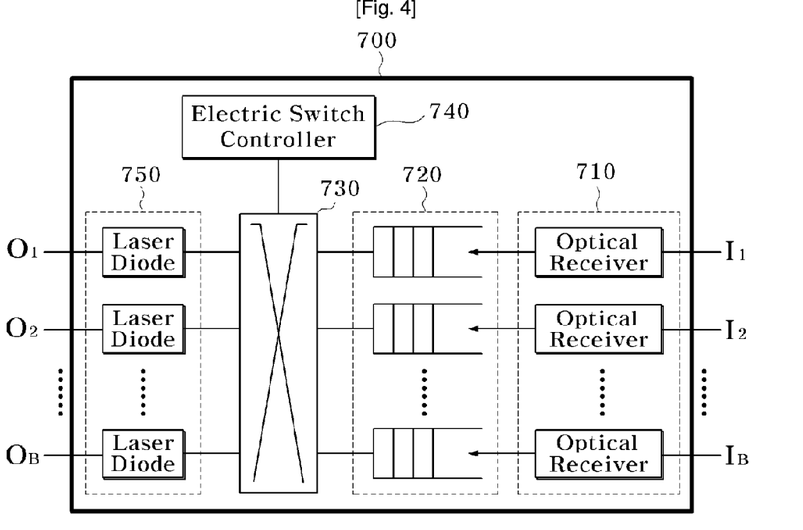
FIG. 4 is a block diagram of an example of a buffer module employed in an exemplary embodiment of the present invention.

FIG. 1 illustrates an overall constitution of an apparatus for transferring optical data in an optical switching system using time synchronization according to an exemplary embodiment of the present invention. FIG. 2 illustrates an example of a constitution of a dynamic time-synchronization module employed in an exemplary embodiment of the present invention. FIG. 3 illustrates another example of a constitution of a dynamic time-synchronization module employed in an exemplary embodiment of the present invention. FIG. 4 is a block diagram of an example of a buffer module employed in an exemplary embodiment of the present invention.

Meanwhile, an apparatus for transferring optical data according to an exemplary embodiment of the present invention is applied to an optical burst switching system among optical switching systems but is not limited thereto. The apparatus can easily be applied to an optical packet switching system also.

Referring to FIGS. 1 to 4, an apparatus for transferring an optical burst having control packets and data bursts at each node of the optical switching system according to an exemplary embodiment of the present invention comprises time synchronizers 100a to 100n, demultiplexers 200a to 200n, a switch 300, multiplexers 400a to 400n, an output time measurement module 500, a control module 600, and a buffer module 700.

The number of input/output optical fibers 1 to F is F in an optical switching system according to an exemplary embodiment of the present invention. Here, a link with an adjacent optical switching system may consist of at least one optical fiber. The number of wavelengths $\lambda_1$ to $\lambda_L$ per optical fiber is L, and the number of input/output data channels $I_1$ to $I_B$ and $O_1$ to $O_B$ of the buffer module 700 is B. Therefore, the total number of input channels of the optical switching system is F×L+B.

The time synchronizers 100a to 100n are respectively disposed on input ports 10a to 10n, i.e., the input optical fibers 1 to F between each input port 10a to 10n and each demultiplexers 200a to 200n. The time synchronizers 100a to 100n perform a dynamic time synchronization function on all optical data before the optical data are input to the demultiplexers 200a to 200n.

The time synchronizers 100a to 100n comprise fiber delay lines (HDLs) 110a to 110n for time synchronization respectively connected to the input ports 10a to 10n, and dynamic time synchronization modules 130a to 130n respectively connected in series to output terminals of the FDLs 110a to 110n. The dynamic time synchronization modules 130a to 130n perform the dynamic time synchronization function on minute time variables depending on an environment, such as temperature, in response to a control signal of the control module 600.

Here, the FDLs 110a to 110n perform the time synchronization function of delaying optical data input to each input port 10a to 10n for a predetermined time and outputting the optical data at the same time to transfer the optical data at regular intervals.

More specifically, with respect to optical data arriving at each input port 10a to 10n, a predetermined difference in data transfer time is caused by distance between nodes, optical line environment, etc. Due to such difference in data transfer time, a data blocking rate between irregularly transferred optical data increases.

Therefore, the FDLs 110a to 110n are respectively input to the input ports 10a to 10n, and time synchronization is performed so that input optical data corresponds to a time (referred to as "reference switching time") previously set at the time of system construction for all nodes to transfer the optical data at regular intervals.

Meanwhile, the FDLs 110a to 110n may have fixed lengths that are previously set according to the input ports 10a to 10n by calculating differences in data transfer time on the basis of distance between nodes, optical line environment, etc. However, the present invention is not limited thereto and may be constituted to have variability depending on needs.

As illustrated in FIG. 2, in an example of the dynamic time synchronization modules 130a to 130n at least one optical circulator OC1 to OCn and at least one optical delayer OD1 to ODn are systemically combined.

More specifically, the optical circulators OC1 to OCn are each disposed on an optical path among first to third optical fibers F1 to F3 and function to transfer optical data output from the FDLs 110a to 110n to the second optical fiber F2 through the first optical fiber F1 and to transfer optical data output in the reverse direction from the second optical fiber F2 to the outside through the third optical fiber F3.

The optical delay units OD1 to ODn function to dynamically delay input optical data for a predetermined time and comprise optical fiber-space collimators FC1 to FCn and optical reflectors OR1 to ORn (preferably, plane mirrors). The optical fiber-space collimators FC1 to FCn are connected with the second optical fibers F2 connected with the optical circulators OC1 to OCn and are provided with optical data transferred through the second optical fibers F2 to generate light in a free space. The optical reflectors OR1 to ORn reflect the light generated by the optical fiber-space collimators FC1 to FCn and make the reflected light travel through the optical fiber-space collimators FC1 to FCn again.

In particular, since a general movement device 135 for moving the positions of the optical reflectors OR1 to ORn in response to the control signal of the control module 600 is included, time synchronization can be dynamically performed by adjusting delay times of optical data according to movement of the positions of the optical reflectors OR1 to ORn, i.e., distance between the optical fiber-space collimators FC1 to FCn and the optical reflectors OR1 to ORn.

Meanwhile, as multiple short paths are formed in a single delay unit, instead of using a single long path, the coupling loss changes due to yaws of the reflector movement device 135 while it travels, can be reduced, as the reflected beam position displacement is smaller in a short reflection path than in a long reflection path.

Although a movement axis of the optical reflectors OR1 to ORn is not the same as a travel direction of the light generated from the optical fiber-space collimators FC1 to FCn when the optical reflectors OR1 to ORn are moved, there is no influence on optical coupling of the optical fibers, thus facilitating implementation.

Meanwhile, the movement device 135 may use, for example, a motor or an oil/air pressure device, but is not limited thereto. The movement device 135 may also use any instrument, device etc. capable of moving the positions.

When the dynamic time synchronization modules 130a to 130n have one optical circulator OC1 and one optical delay unit OD1, the third optical fiber F3 connected to the optical circulator OC1 is directly connected to each demultiplexer 200a to 200n.

Meanwhile, when the dynamic time synchronization modules 130a to 130n have at least two optical circulators OC1 to OCn and optical delay units OD1 to ODn, the first and third optical fibers F1 and F3 connected to different optical circulators OC1 to OCn are connected with each other so that optical data input to the dynamic time synchronization modules 130a to 130n can pass all the optical circulators OC1 to OCn and all the optical delayers OD1 to ODn. In addition, the third optical fiber F3 connected to the last optical circulator OCn is connected to each demultiplexer 200a to 200n.

The optical circulators OC1 to OCn and the optical fiber-space collimators FC1 to FCn included in the dynamic time synchronization modules 130a to 130n are ordinary devices, and thus detailed descriptions of the internal constitutions thereof will be omitted.

As illustrated in FIG. 3, in another example of the dynamic time synchronization modules 130a to 130n at least one optical isolator OI1 to OIn, optical delay units OD1 to ODn and at least one optical splitter OS1 to OSn are systemically combined.

More specifically, the optical isolators OI1 to OIn are each disposed on an optical path between first and second optical fibers F1 and F2 and function to transfer optical data output from the FDLs 110a to 110n to the second optical fiber F2 through the first optical fiber F1 and block optical data output in the reverse direction from the second optical fiber F2.

The optical splitters OS1 to OSn are each disposed on an optical path among the second to fourth optical fibers F2 to F4 and function to transfer optical data output through the second optical fiber F2 to the third optical fiber F3 and optical data output in the reverse direction from the third optical fiber F3 to the outside through the fourth optical fiber F4.

Since the optical delay units OD1 to ODn have the same constitution and perform the same function as those of FIG. 2, reference to the description of FIG. 2 is recommended for the detailed descriptions thereof.

When the dynamic time synchronization modules 130a to 130n have one optical isolator OI1 one optical splitter OS1, and one optical delay unit OD1, the fourth optical fiber F4 connected to the optical splitter OS1 is directly connected to each demultiplexer 200a to 200n.

Meanwhile, when the dynamic time synchronization modules 130a to 130n have at least two optical isolators OI1 to OIn, optical splitters OS1 to OSn and optical delay units OD1 to ODn, the fourth optical fibers F4 connected to the optical splitters OS1 to OSn except for the last optical splitter OSn are connected with the first optical fibers connected to the next optical isolators OI2 to OIn so that optical data input to the dynamic time synchronization modules 130a to 130n can pass all the optical isolators OI1 to OIn, all the optical splitters OS1 to OSn and all the optical delayers OD1 to ODn. In addition, the fourth optical fiber F4 connected to the last optical splitter OSn is connected to each demultiplexer 200a to 200n.

The optical isolators OI1 to OIn and the optical splitters OS1 to OSn included in the dynamic time synchronization modules 130a to 130n are ordinary devices, thus allowing omission of detailed descriptions of the internal constitutions thereof.

The demultiplexers 200a to 200n function to separate channels so that control packets and data bursts of an optical burst multiplexed by a wavelength division multiplexing (WDM) technique and transferred from an external link through a plurality of input ports 10a to 10n can be respectively transferred through different input channels, i.e., input control channels $I_{CC}$ and input data channels $I_{DC}$.

The switch 300, connected between the demultiplexers 200a to 200n and the multiplexers 400a to 400n through the input data channels $I_{DC}$ and output data channels $O_{DC}$, functions to switch the input data channels $I_{DC}$ to the output data channels $O_{DC}$ so that the data burst can be transferred to a desired destination node according to routing information of the control packet obtained from the control module 600.

According to output terminals, the multiplexers 400a to 400n multiplex the output data channels $O_{DC}$ and output control channels $O_{CC}$ by the WDM technique and are connected to an external link through a plurality of output ports 20a to 20n.

The output time measurement module 500 is connected to the respective output data channels $O_{DC}$ between the switch 300 and the multiplexers 400a to 400n and functions to measure output times of all optical data output from the switch 300 and transfer output time information to the control module 600.

The control module 600 is connected between the demultiplexers 200a to 200n and the multiplexers 400a to 400n through the input/output control channels $I_{CC}$ and $O_{CC}$ and performs overall control of the optical switching system. The control module 600 functions to receive a control packet transferred through the input control channels $I_{CC}$ and obtain routing information required for transferring the corresponding data burst to a desired destination node.

In addition, the control module 600 functions to check whether output resources (e.g., wavelength) are available or not and determine whether contention between data bursts occurs or not. According to the determination result, the control module 600 functions to make the corresponding data burst directly transferred using the available output resources, or to output a predetermined control signal to the switch 300 to transfer data bursts contending with each other to the buffer module 700 for loss prevention.

More specifically, when contention between data burst does not occur as a result of determination (i.e., available destination output resources exist), the control module 600 directly transfers the corresponding data burst to the desired destination node using the available destination output resources.

On the other hand, when contention occurs between data bursts (i.e., a plurality of data bursts input at the same time attempt to simultaneously occupy the same output resources), the control module 600 transfers the data bursts to the buffer module 700 through the available input data channels $I_1$ to $I_B$ and controls the buffer module 700 to perform a predetermined buffering function so as to prevent loss of the data bursts.

In addition, the control module 600 measures output times of all optical data passed through the FDLs 110a to 110n of the time synchronizers 100a to 100n, compares them with a previously set reference switching time to determine whether to perform time synchronization or not, and controls the dynamic time synchronization modules 130a to 130n according to a determination result.

In addition, the control module 600 is provided with the output time information of all the optical data measured by the output time measurement module 500, compares it with the previously set reference switching time and determines whether to perform time synchronization or not. According to the determination result, the control module 600 controls the output time of optical data output from the buffer module 700.

The buffer module 700 is generally controlled by the control module 600 and connected through the input/output data channels $I_1$ to $I_B$ and $O_1$ to $O_B$ allocated to the switch 300. When contention occurs between data bursts, the buffer module 700 functions to receive the data bursts contending with each other by the control of the control module 600, convert them into electric signals, perform buffering according to whether output resources are available or not, convert them into available output resources (e.g., wavelengths), and transfer them.

As illustrated in FIG. 4, the buffer module 700 comprises an optical/electric conversion unit 710, a buffering unit 720, an electric switch 730, an electric switch controller 740, and an electric/optical conversion unit 750.

The optical/electric conversion unit 710 functions to convert optical signals corresponding to data bursts input through the input data channels $I_1$ to $I_B$ of the buffer module 700 into electric signals.

The optical/electric conversion unit 710 comprises a plurality of optical receivers, which may be connected to the input data channels $I_1$ to $I_B$ of the buffer module 700, respectively.

In addition, the optical receivers in the optical/electric conversion unit 710 may be implemented by devices, e.g., photo detectors, etc., capable of receiving all the input wavelengths $\lambda_1$ to $\lambda_L$ in the optical switching system.

The buffering unit 720 is connected to output terminals of the optical/electric conversion unit 710 and functions to receive the data bursts converted into the electric signals by the optical/electric conversion unit 710 and temporarily store them. Thus, the data bursts converted into the electric signals are on standby in the buffering unit 720 until available output resources are detected.

The buffering unit 720 may be implemented by electric memories, e.g., random access memories (RAMs), etc.

The electric switch 730 is connected with output terminals of the buffering unit 720 and input terminals of the electric/optical conversion unit 750, i.e., between the buffering unit 720 and the electric/optical conversion unit 750, and functions to switch the data bursts stored in the buffering unit 720 to an available output laser diode of the buffer module 700 in response to a predetermined drive control signal output from the electric switch controller 740 so that the data bursts can be transferred using available output resources.

The electric switch controller 740 functions to control the switching operation of the electric switch 730 in response to a predetermined control signal output from the control module 600.

Here, the control module 600 checks output resources of the buffer module 700 (i.e., whether the output data channels $O_1$ to $O_B$ are available or not), and outputs a predetermined control signal to the electric switch controller 740 so that the data bursts stored in the buffering unit 720 can be transferred to the available output laser diode of the electric/optical conversion unit 750.

The electric/optical conversion unit 750 is connected with output terminals of the electric switch 730 and the output data channels $O_1$ to $O_B$ of the buffer module 700 and functions to convert the electric signals corresponding to the data bursts output from the electric switch 730 into optical signals corresponding to the available output resources.

The electric/optical conversion unit 750 may be implemented by a plurality of optical transmission laser diode, which may be connected to the output data channels $O_1$ to $O_B$ of the buffer module 700, respectively.

Here, the laser diodes may be implemented by variable wavelength laser diodes or fixed wavelength laser diodes. When the laser diodes are implemented by fixed wavelength laser diodes, the fixed wavelength laser diodes numbering as desired output resources (wavelengths, for example) may exist.

Figure 5:
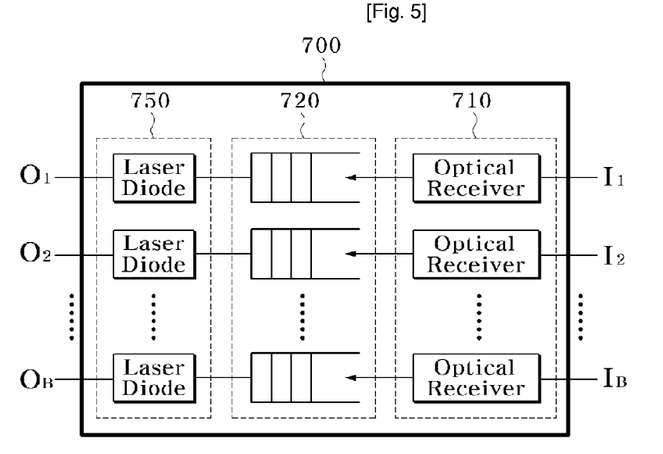
FIG. 5 is a block diagram of another example of a buffer module employed in an exemplary embodiment of the present invention.

FIG. 5 is a block diagram of another example of the buffer module employed in an exemplary embodiment of the present invention, showing a structure of FIG. 4 from which the electric switch 730 and the electric switch controller 740 are removed.

Meanwhile, since the same components as those of the buffer module 700 shown in FIG. 4 use the same numerals and names, reference to the description of FIG. 4 is recommended for the detailed operation and effects thereof.

Particularly, as for difference with the buffer module 700 shown in FIG. 4, another example of the buffer module 700 according to an exemplary embodiment of the present invention has a structure in which output terminals of the buffering unit 720 are directly connected to the electric/optical conversion unit 750. In response to the predetermined control signal output from the control module 600, data bursts stored in the buffering unit 720 are converted by the electric/optical conversion unit 750 into available output resources in an output terminal of the optical switching system and transferred. Thus, in comparison with the buffer module 700 shown in FIG. 4, the buffer module 700 of another example can be implemented at a lower cost more simply and easily.

Figure 6:
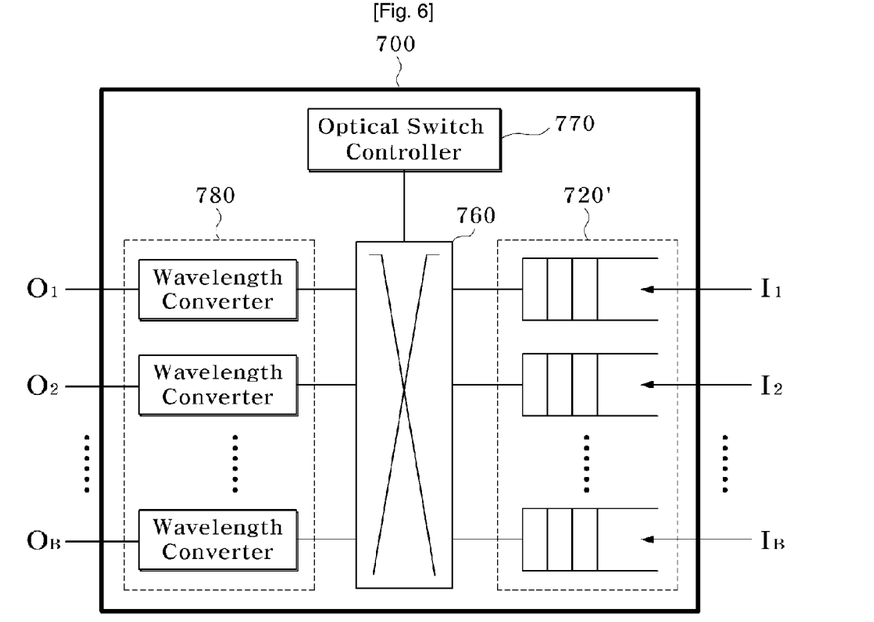
FIG. 6 is a block diagram of yet another example of a buffer module employed in an exemplary embodiment of the present invention.

FIG. 6 is a block diagram of yet another example of the buffer module employed in an exemplary embodiment of the present invention, showing a structure of the buffer module 700 including a buffering unit 720' comprising optical memories other than the buffering unit 720 comprising electric memories as shown in FIGS. 4 and 5.

Referring to FIG. 6, yet another example of the buffer module 700 employed in an exemplary embodiment of the present invention comprises the buffering unit 720', an optical switch 760, an optical switch controller 770 and a wavelength conversion unit 780.

The buffering unit 720' functions to receive data bursts input through the input data channels $I_1$ to $I_B$ of the buffer module 700 and temporarily store them. Thus, the data bursts consisting of optical signals are on standby in the buffering unit 720' until available output resources are detected.

The buffering unit 720' may be implemented by optical memories, e.g., optical RAMs, etc., and connected to the input data channels $I_1$ to $I_B$, respectively.

The electric switch 760 is connected with output terminals of the buffering unit 720' and input terminals of the wavelength conversion unit 780, i.e., between the buffering unit 720' and the wavelength conversion unit 780, and functions to switch the data bursts stored in the buffering unit 720' to an available output wavelength converter of the buffer module 700 in response to a predetermined drive control signal output from the optical switch controller 770 so that the data bursts can be transferred through the available output resources.

The optical switch controller 770 functions to control the switching operation of the optical switch 760 in response to a predetermined control signal output from the control module 600.

Here, the control module 600 checks output resources of the buffer module 700, i.e., whether the output data channels $O_1$ to $O_B$ are available or not, and outputs a predetermined control signal to the optical switch controller 770 so that the data bursts stored in the buffering unit 720' can be transferred to the available output wavelength converter of the wavelength conversion unit 780.

The wavelength conversion unit 780 is connected with output terminals of the optical switch 760 and the output data channels $O_1$ to $O_B$ of the buffer module 700 and functions to convert the data bursts output from the optical switch 760 into a wavelength corresponding to the available output resources.

The wavelength conversion unit 780 may be implemented by a plurality of wavelength converters, which may be connected to the output data channels $O_1$ to $O_B$ of the buffer module 700, respectively.

In addition, the apparatus for transferring optical data may further comprise FDLs for time difference compensation TS respectively disposed on optical wavelength channels (i.e., the input data channels $I_{DC}$) separated by the demultiplexers 200a to 200n, delaying optical data for a predetermined time and outputting them to compensate time difference between wavelengths due to transmission-fiber chromatic dispersion.

In addition, the apparatus for transferring optical data may further comprise FDLs TS' respectively disposed on optical wavelength channels (i.e., the output data channels $O_{DC}$) between the switch 300 and the multiplexers 400a to 400n, delaying optical data for a predetermined time and outputting them to compensate for differences in optical data transfer time due to an external environment of optical lines.

Figure 7:
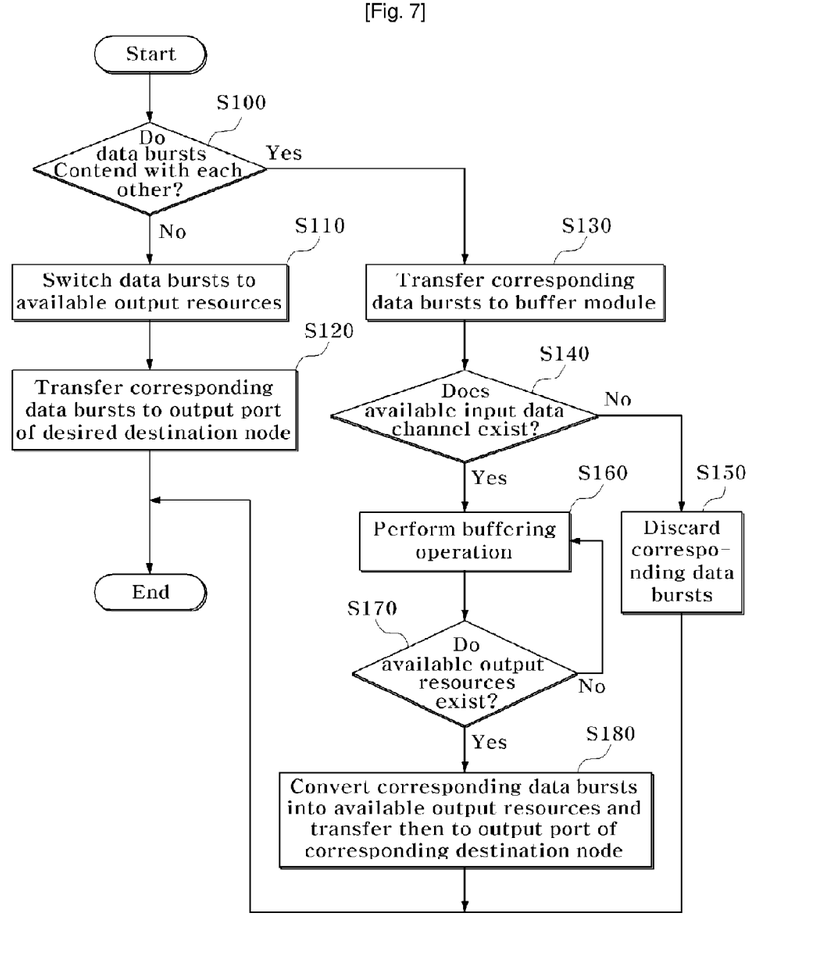
FIG. 7 is a flowchart illustrating the operation of an apparatus for transferring optical data in an optical switching system using time synchronization according to an exemplary embodiment of the present invention.

FIG. 7 is a flowchart illustrating the operation of an apparatus for transferring optical data in an optical switching system using time synchronization according to an exemplary embodiment of the present invention. Except for a case in which a subject is specified, operations are performed by the control module 600 (refer to FIG. 1).

Referring to FIG. 7, in step 100 time synchronization is dynamically performed on all optical data by the time synchronizers 100a to 100n (refer to FIG. 1) respectively disposed on the input ports 10a to 10n (refer to FIG. 1) before the optical data are input to the demultiplexers 200a to 200n (refer to FIG. 1), and then it is determined whether the optical data contend with each other or not on the basis of routing information of control packets transferred through the input control channels $I_{CC}$ of the control module 600.

As a determination result of step 100, when contention does not occur between the optical data, the optical data are switched to available output resources without wavelength conversion or buffering in step 110 and then transferred to an output port of a desired destination node in step 120.

As a determination result of step 100, when contention occurs between the optical data, the optical data are transferred to the buffer module 700 (refer to FIG. 1) in step 130, and it is determined whether an available input data channel exists or not among the input data channels $I_1$ to $I_B$ (refer to FIG. 1) in step 140.

As a determination result of step 140, when an available input data channel does not exist among the input data channels $I_1$ to $I_B$, the optical data are discarded in step 150. On the contrary, when an available input data channel exists among the input data channels $I_1$ to $I_B$, the buffering operation is performed in step 160.

More specifically, optical signals corresponding to the data bursts are converted into electric signals by the optical/electrical conversion unit 710 (refer to FIG. 4), and then, the data bursts converted into the electric signals are temporarily stored in the buffering unit 720 (refer to FIG. 4).

Subsequently, in step 170, it is determined whether available output resources exist or not in the output terminal of the optical switching system. When available output resources exist, control information (such as headers, labels and control packets) is updated and the data bursts stored in the buffering unit 720 are transferred to the electric/optical conversion unit 750 (refer to FIG. 4), or the electric switch 730 (refer to FIG. 4) and the electric/optical conversion unit 750, to be converted into the available output resources and transferred to an output port of a desired destination node in step 180.

As a determination result of step 170, when available output resources do not exist in the output terminal of the optical switching system, the procedure proceeds to step 160, and the buffering operation is performed in a series.

Meanwhile, although not shown in drawings, the control module 600 is provided with output time information of all optical data measured by the output time measurement module 500 (refer to FIG. 1), compares it with a previously set reference switching time, determines whether to perform time synchronization or not, and controls output times of optical data output from the buffer module 700 according to the determination result.

Figure 8:
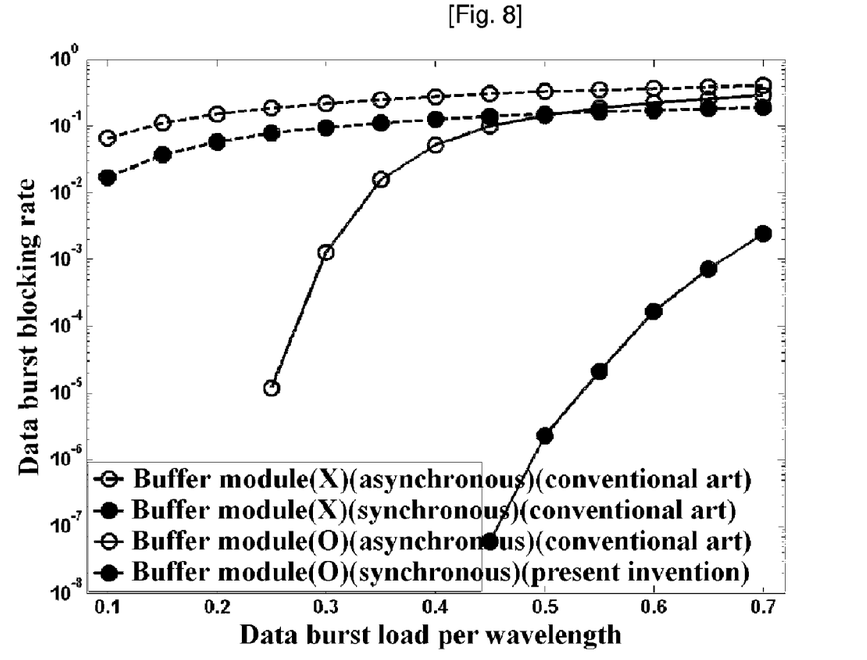
FIG. 8 is a graph showing a data burst blocking rate versus data burst load per wavelength of an apparatus for transferring optical data in an optical switching system using time synchronization.

FIG. 8 is a graph showing a data burst blocking rate versus data burst load per wavelength of an apparatus for transferring optical data in an optical switching system using time synchronization.

Referring to FIG. 8, performance analysis was performed under predetermined conditions based on an apparatus for transferring optical data in an optical switching system using time synchronization according to an exemplary embodiment of the present invention. According to the conditions, 8 input ports, 8 output ports, 32 wavelengths per port, and 0 or 38 input/output data channels of a buffer module (15% of entire input/output data channels) were allocated, and input traffic arrived with an average exponential distribution of 100 KB by an ordinary poisson process (asynchronous) or with a fixed size of 100 KB and a discrete multiple of 100 KB. In addition, the method of transferring the data burst using the output wavelength having the earliest available time was used as a scheduling scheme. Data bursts buffered in the buffer module were basically transferred on a first-come first-serve basis, but a data burst using the first available output wavelength was first transferred.

As a result of the performance analysis under the above-described conditions, it can be seen that a synchronous constitution has improved performance compared to an asynchronous constitution in both an optical switching system comprising only a passive switch without a buffer module and the optical switching system suggested above. In particular, when a synchronous constitution was used in the optical switching system suggested above, overall system performance was significantly improved.

According to the apparatus and method for transferring optical data in an optical switching system using time synchronization, the time synchronization is performed on all optical data before the optical data are input to a switch, and the optical data are input with a uniform size at regular intervals. Thus, a data blocking rate can be reduced to be lower than that of a conventional optical switching system using an asynchronous electric buffer without a synchronization process, and system cost is reduced by obtaining the same performance despite using fewer wavelength converters and buffers in comparison with conventional asynchronous technology.

Meanwhile, as the use of a synchronous switching system, the sharing ratio and the ratio of the required number of buffers, can be reduced to achieve the same performance with the asynchronous system. This is the main reason for reduction of the overall cost and power consumption because OEOs and WCs are the most expensive and power-consuming parts of the system.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

The invention claimed is:

1. An apparatus for transferring optical data in an optical switching system using time synchronization, the optical switching system comprising demultiplexers and multiplexers respectively connected to a plurality of input ports and output ports and transferring optical data having transfer information using a plurality of wavelengths, and a switch connected between the demultiplexers and the multiplexers and switching the optical data to an output port of a desired destination node, the apparatus comprising:

time synchronization means respectively disposed on the input ports to dynamically time-synchronize all the optical data before optical data are input to the demultiplexers;

time measurement means connected between the switch and the multiplexers to measure output times of all optical data output from the switch;

buffer means connected between input terminals and output terminals of the switch, and receiving the optical data from the switch when contention occurs among the optical data to perform buffering according to whether or not output resources are available and then transfer them to a corresponding output port; and control means for checking contention between the optical data on the basis of the transfer information according to whether or not output resources are available to control the switch, receiving information on output times of all the optical data measured by the time measurement means and comparing the information with a previously set reference switching time to determine whether or not to perform time synchronization, and controlling output times of the optical data output from the buffer means according to the determination result.

2. The apparatus according to claim 1, wherein the time synchronization means comprises:

fiber delay lines respectively connected to the input ports, delaying the input optical data for a predetermined time, and outputting the optical data to transfer the optical data at regular intervals; and dynamic time synchronization modules respectively connected to output terminals of the fiber delay lines, and dynamically performing time synchronization on minute time variations depending on an external environment in response to a control signal of the control means, wherein the control means measures output times of the optical data passed through the fiber delay lines, compares the output times with the previously set reference switching time to determine whether to perform time synchronization or not, and controls the dynamic time synchronization modules according to the determination result.

3. The apparatus according to claim 2, wherein the dynamic time synchronization module comprises:

at least one optical circulator disposed on an optical path among first to third optical fibers, and transferring the optical data output from the fiber delay lines to the second optical fiber through the first optical fiber and optical data output in a reverse direction from the second optical fiber to the outside through the third optical fiber; and at least one optical delay unit: including an optical fiber-space collimator receiving the optical data transferred through the second optical fiber and generating a light beam in a free space, and an optical reflector for reflecting the light generated by the optical fiber-space collimator and making the reflected light travel through the optical fiber-space collimator again; and delaying the optical data output from the fiber delay lines for a predetermined time and then outputting the optical data according to a position of the optical reflector, wherein the third optical fiber is directly connected to the demultiplexer when there is one optical circulator and optical delay unit, the optical circulators are connected by the first and third optical fibers when there are two or more optical circulators and optical delayers, the third optical fiber connected to the last optical circulator is connected to the demultiplexer, and the control means controls the positions of the optical reflectors to adjust a delay time of the optical data.

4. The apparatus according to claim 2, wherein dynamic time synchronization module comprises:

at least one optical isolator disposed on an optical path between first and second optical fibers, transferring the optical data output from the fiber delay lines to the second optical fiber through the first optical fiber, and blocking optical data output in a reverse direction from the second optical fiber;

at least one optical splitter disposed on an optical path among the second optical fiber and third and fourth optical fibers, transferring optical data output through the second optical fiber to the third optical fiber, and transferring optical data output in a reverse direction from the third optical fiber to the outside through the fourth optical fiber; and at least one optical delay unit: including an optical fiber-space collimator receiving the optical data output through the third optical fiber to generate light in a free space, and an optical reflector for reflecting the light generated by the optical fiber-space collimator and making the reflected light travel through the optical fiber-space collimator again; and delaying the optical data output from the fiber delay lines for a predetermined time and then outputting the optical data according to a position of the optical reflector, wherein the fourth optical fiber is directly connected to the demultiplexer when there is one optical isolator, optical splitter and optical delay unit, the first and fourth optical fibers are connected to each other when there are two or more optical isolators, optical splitters and optical delay units, the fourth optical fiber connected to the last optical splitter is connected to the demultiplexer, and the control means controls positions of the optical reflectors to adjust a delay time of the optical data.

5. The apparatus according to claim 1, wherein the buffer means comprises:
an optical/electric conversion unit for converting optical signals corresponding to the input optical data into electric signals;
a buffering unit for temporarily storing the optical data converted into the electric signals; and
an electric/optical conversion unit for, when output resources are available, converting the electric signals corresponding to the optical data stored in the buffering unit into optical signals corresponding to the available output resources.

6. The apparatus according to claim 5, wherein the buffer means further comprises:
an electric switch connected between the buffering unit and the electric/optical conversion unit and switching the optical data stored in the buffering unit to the available output resources of the electric/optical conversion unit in response to a control signal of a control module.

7. The apparatus according to claim 5, wherein the optical/electrical conversion unit comprises a plurality of optical receivers.

8. The apparatus according to claim 5, wherein the buffering unit comprises an electrical random access memory (RAM).

9. The apparatus according to claim 5, wherein the electrical/optical conversion unit comprises a plurality of optical transmission laser diodes.

10. The apparatus according to claim 9, wherein the laser diodes are variable wavelength laser diodes or fixed wavelength laser diodes.

11. The apparatus according to claim 1, wherein the buffer means comprises:
a buffering unit for temporarily storing input optical data; and
a wavelength conversion unit for, when output resources are available, converting the optical data stored in the buffering unit into a wavelength corresponding to available output resources.

12. The apparatus according to claim 11, wherein the buffer means further comprises a buffer switch connected between the buffering unit and the wavelength conversion unit, and switching the optical data stored in the buffering unit to the available output resources of the wavelength conversion unit in response to a control signal of a control module.

13. The apparatus according to claim 11, wherein the buffering unit comprises an optical memory.

14. The apparatus according to claim 1, further comprising fiber delay lines for time difference compensation respectively disposed on optical wavelength channels separated by the demultiplexers, and delaying the optical data for a predetermined time and then outputting the optical data to compensate for a time difference between wavelengths due to transmission-fiber chromatic dispersion.

15. The apparatus according to claim 1, further comprising fiber delay lines respectively disposed on optical wavelength channels between the switch and the multiplexers, and delaying the optical data for a predetermined time and then outputting the optical data to compensate for a difference in optical data transfer time due to an external environment of optical lines.

* * * * *